United States Patent
McCaldon et al.

(10) Patent No.: US 10,184,403 B2
(45) Date of Patent: Jan. 22, 2019

(54) ATOMIZING FUEL NOZZLE

(71) Applicant: PRATT & WHITNEY CANADA CORP., Longueuil (CA)

(72) Inventors: Kian McCaldon, Orangeville (CA); Oleg Morenko, Oakville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 725 days.

(21) Appl. No.: 14/458,533

(22) Filed: Aug. 13, 2014

(65) Prior Publication Data
US 2016/0047315 A1    Feb. 18, 2016

(51) Int. Cl.
| F23R 3/14 | (2006.01) |
| F02C 7/22 | (2006.01) |
| F23R 3/28 | (2006.01) |
| F23R 3/12 | (2006.01) |

(52) U.S. Cl.
CPC ............ F02C 7/22 (2013.01); F23R 3/12 (2013.01); F23R 3/28 (2013.01); *F23D 2900/11101* (2013.01)

(58) Field of Classification Search
CPC .... F23R 3/286; F23R 3/14; F23R 3/12; F23R 3/58; F23D 2900/14021; F23D 2900/11101; F23D 11/106; F23D 11/107; F23D 11/108; F23C 7/02
See application file for complete search history.

(56) References Cited

U.S. PATENT DOCUMENTS

| | | | |
|---|---|---|---|
| 3,739,990 A | 6/1973 | Triggs | |
| 3,826,079 A * | 7/1974 | Quigg | F23R 3/12 |
| | | | 431/10 |
| 3,938,323 A * | 2/1976 | Quigg | F23R 3/002 |
| | | | 60/748 |
| 4,698,014 A * | 10/1987 | Grethe | B05B 7/065 |
| | | | 239/403 |
| 5,086,979 A * | 2/1992 | Koblish | F23D 11/107 |
| | | | 239/404 |
| 5,144,804 A * | 9/1992 | Koblish | F23D 11/107 |
| | | | 60/740 |
| 5,167,116 A * | 12/1992 | Koblish | F23D 11/107 |
| | | | 60/776 |
| 5,505,045 A * | 4/1996 | Lee | F23D 11/107 |
| | | | 239/424 |
| 5,579,645 A | 12/1996 | Prociw et al. | |
| 6,082,113 A | 7/2000 | Prociw et al. | |

(Continued)

*Primary Examiner* — Arun Goyal
(74) *Attorney, Agent, or Firm* — Norton Rose Fulbright Canada LLP

(57) ABSTRACT

A fuel nozzle for a gas turbine engine. The nozzle has a body and a center axis. The body has an inner circumferential surface circumscribing a central passageway which is coaxial with the center axis. The nozzle also has air passages which extend predominantly radially inward through the body. The air passage outlets of each air passage are circumferentially spaced apart from one another along the inner circumferential surface. Each air passage conveys air through the body toward the nozzle center axis and into the central passageway. The nozzle also has fuel passages which extend through the body. Each fuel passage is disposed within the body between adjacent circumferentially spaced apart air passages and is transverse to the direction of extension of its neighboring air passages.

16 Claims, 7 Drawing Sheets

(56) References Cited

U.S. PATENT DOCUMENTS

| | | | |
|---|---|---|---|
| 6,247,317 B1 | 6/2001 | Kostka | |
| 6,289,677 B1 | 9/2001 | Prociw et al. | |
| 6,755,024 B1 | 6/2004 | Mao et al. | |
| 6,820,425 B2 * | 11/2004 | David | F23D 11/107 60/743 |
| 7,546,734 B2 * | 6/2009 | Dorr | F23R 3/14 60/737 |
| 8,375,548 B2 | 2/2013 | Stastny et al. | |
| 8,607,570 B2 | 12/2013 | Hadley et al. | |
| 8,667,800 B2 | 3/2014 | Cornwell et al. | |
| 9,482,433 B2 * | 11/2016 | Lee | F23R 3/286 |
| 2010/0107653 A1 | 5/2010 | Paskevich et al. | |
| 2014/0033721 A1 | 2/2014 | Marquez et al. | |
| 2015/0345795 A1 | 12/2015 | Ramier et al. | |

* cited by examiner

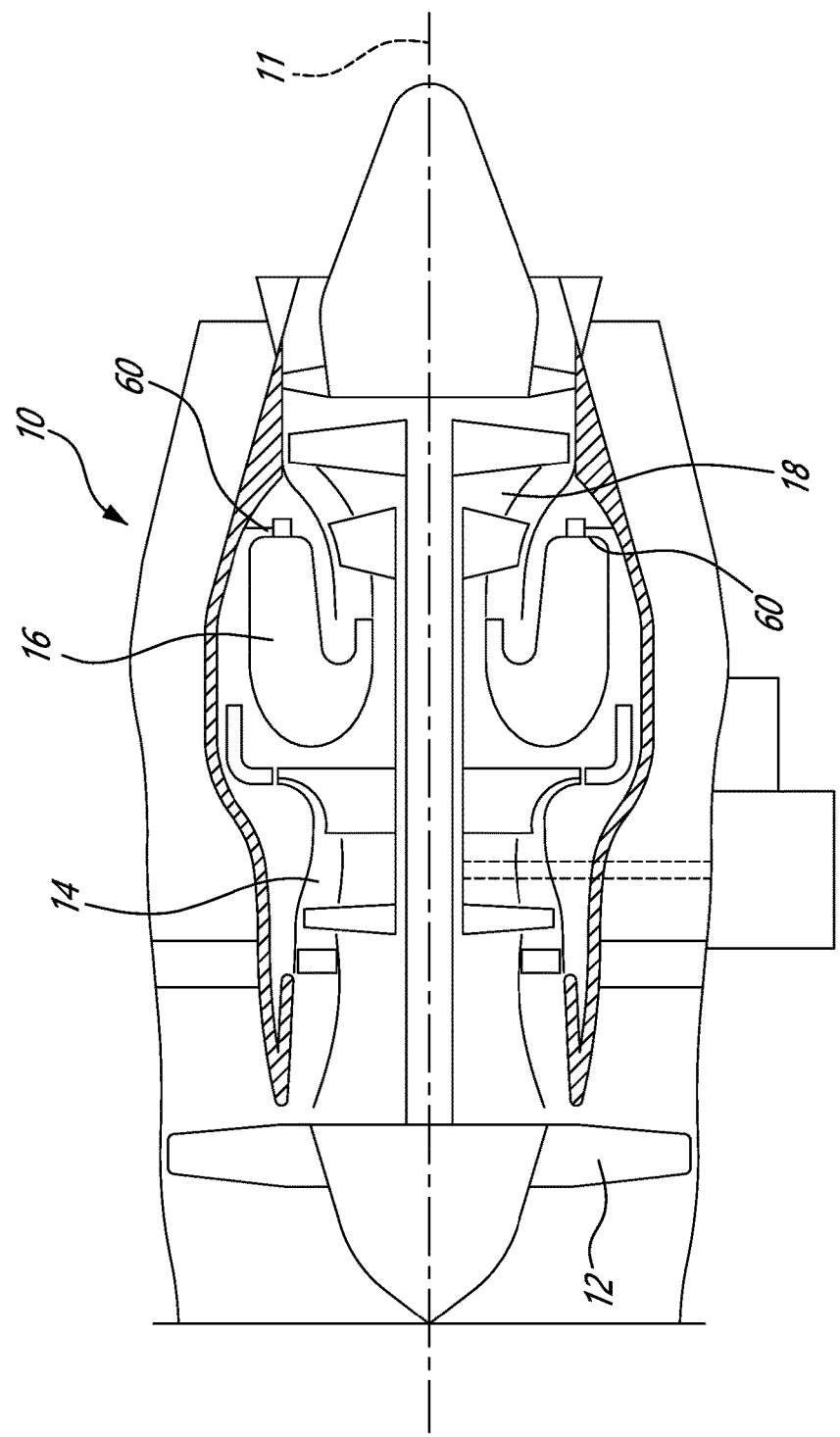

US 10,184,403 B2

ATOMIZING FUEL NOZZLE

TECHNICAL FIELD

The application relates generally to gas turbine engines, and more particularly to fuel nozzles for combustors of gas turbine engines.

BACKGROUND

The design of fuel nozzles for small gas turbine engines is often highly constrained by space requirements. This is particularly true for hybrid fuel nozzles, namely those which employ two nozzles (a pressure atomising starting fuel nozzle within an airblast nozzle), which require that conduits for conveying air be grouped in proximity with conduits for conveying fuel. This is relatively difficult to achieve within the limited space envelope and design constraints of a small hybrid nozzle. Adding to the difficulty is the requirement for some hybrid nozzles that the air conduits cross the fuel conduits in the constrained space at the nozzle tip in order to achieve the desired spray angle. The minimal requirements for wall thicknesses, conduit sizes, and tolerances make it difficult to design, manufacture, and service such fuel nozzles.

SUMMARY

In one aspect, there is provided a fuel nozzle for a combustor of a gas turbine engine, comprising: an annular body defining a nozzle center axis, the body axially extending along the nozzle center axis between an upstream surface and a downstream surface, and having an inner circumferential surface circumscribing a central air passageway being coaxial with the nozzle center axis; a plurality of air passages, each air passage extending predominantly radially inward through the body toward the nozzle center axis between an air passage inlet and an air passage outlet, the air passage outlets of each air passage circumferentially spaced apart from one another along the inner circumferential surface of the body, each air passage in use conveying air through the body toward the nozzle center axis and into the central air passageway; and a plurality of fuel passages, each fuel passage extending through the body between a fuel passage inlet at the upstream surface of the body and a fuel passage outlet at the downstream surface of the body, each fuel passage disposed within the body between adjacent circumferentially spaced apart air passages and being transverse thereto.

There is also provided a fuel nozzle for a combustor of a gas turbine engine, comprising: an inner fuel atomizing nozzle in use conveying fuel along a nozzle center axis from an upstream end to a downstream end, the inner atomizing nozzle having a convergent outer member converging towards a convergent extremity defining an outlet coaxial with the nozzle center axis; an outer atomizing nozzle, comprising: an annular body disposed about the convergent outer member and coaxial therewith, the body axially extending between an upstream surface and a downstream surface and having an inner circumferential surface; a circumferential cap extending away from the downstream surface of the body and converging towards an outer nozzle exit coaxial with the nozzle center axis, the cap having an inner cap surface and defining a cavity between the inner cap surface and the convergent outer member of the inner atomizing nozzle; a plurality of air passages, each air passage extending predominantly radially inward through the body toward the nozzle center axis between an air passage inlet and an air passage outlet, the air passage outlets of each air passage circumferentially spaced apart from one another about the inner circumferential surface of the body, each air passage in use conveying air through the body and into the cavity; and a plurality of fuel passages, each fuel passage extending through the body between a fuel passage inlet at the upstream surface of the body and a fuel passage outlet at the downstream surface of the body, each fuel passage disposed within the body between adjacent circumferentially spaced apart air passages and being transverse thereto.

There is further provided a method of spraying an air and fuel mixture into a combustor of a gas turbine engine using a fuel nozzle having a nozzle center axis and an inner central passageway, the method comprising: conveying air through the nozzle via air passages along a first direction toward the central passageway; conveying fuel through the nozzle via fuel passages disposed between circumferentially adjacent air passages along a second direction, the second direction being transverse to the first direction; and conveying the fuel from the fuel passages via fuel passage outlets, and conveying the air from the air passages via air passage outlets, the fuel exiting the fuel passage outlets downstream of the air exiting the air passage outlets, the fuel and air mixing together to produce the air and fuel mixture.

DESCRIPTION OF THE DRAWINGS

Reference is now made to the accompanying figures in which:

FIG. 1 is a schematic cross-sectional view of a gas turbine engine;

DETAILED DESCRIPTION

Figure 2A:
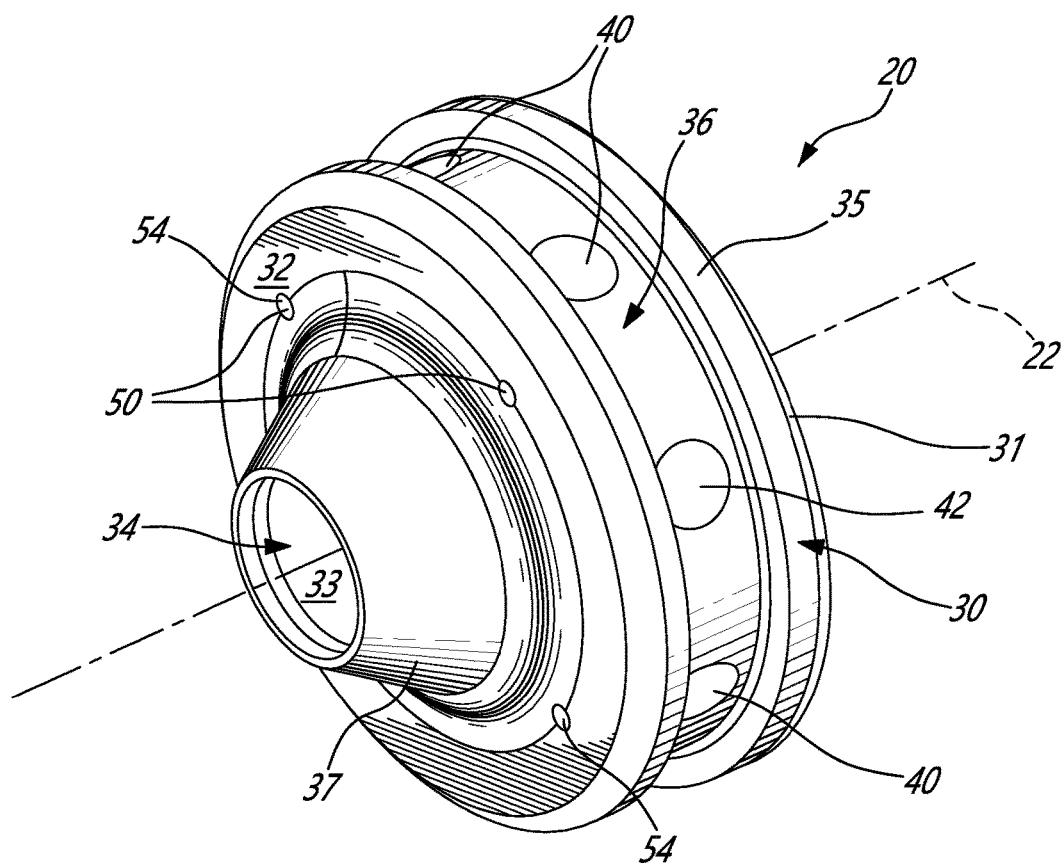
FIG. 2A is a perspective view of an atomizing nozzle, according to an embodiment of the present disclosure.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The gas turbine engine 10 has one or more nozzles 60 which supply the combustor 16 with the fuel which is combusted with the air in order to generate the hot combustion gases.

Figure 2B:
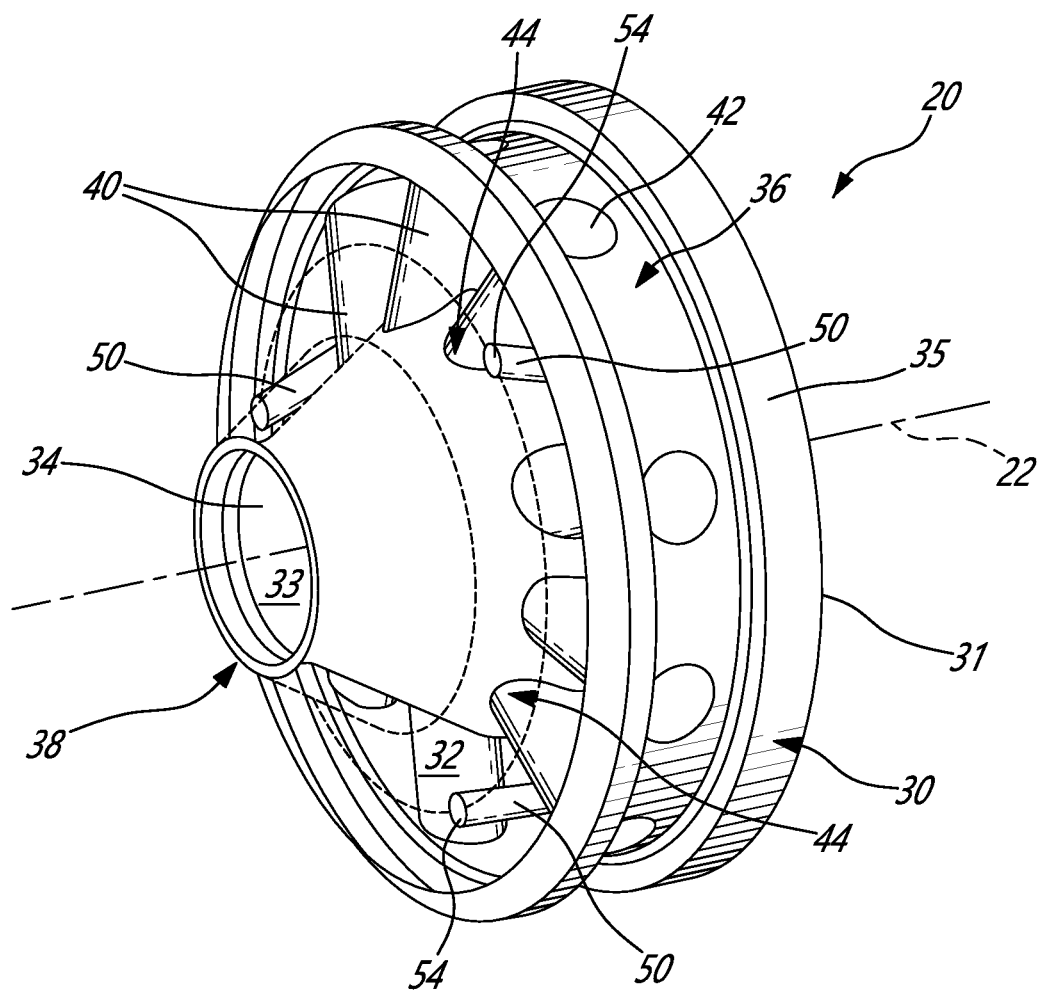
FIG. 2B is another perspective view of the atomizing nozzle of FIG. 2A, showing an interior of the nozzle.

An example of one such fuel nozzle 60, or a component thereof, is provided in FIGS. 2A and 2B. The atomizing fuel nozzle 20 of the present disclosure is shown for atomizing a mixture of air and fuel to be combusted. The atomization of the fuel and air into finely dispersed particles occurs because the air and fuel are supplied to the nozzle 20 under relatively high pressure, and mixed together within the nozzle 20. The nozzle 20 therefore outputs a fine and uniformly-distributed mist mixture of the air and fuel. In providing such a fine mist, the nozzle 20 helps to ensure a more efficient combustion of the mixture.

Referring to FIGS. 2A and 2B, the nozzle 20 includes generally an annular body 30, a plurality of air passages 40 extending through the body 30, and plurality of fuel passages 50 also extending through the body 30.

The body 30 forms the corpus of the nozzle 20 and provides structure thereto. It is typically a round member which is coaxial with the nozzle 20 about the nozzle center axis 22. The body 30 has a length along a direction parallel to the nozzle center axis 22, and extends between an upstream surface 31 and a downstream surface 32. The terms "upstream" and "downstream" refer to the direction along which fuel flows through the body 30. Therefore, the upstream end of the body 30 corresponds to the portion where fuel enters the body 30, and the downstream end corresponds to the portion of the body 30 where fuel exits.

Although generally conical and/or circumferential about a nozzle center axis 22, the nozzle 20 can also take different shapes provided that it converges the supply of air and fuel together in order to output a spray mixture of both. In the embodiment shown in FIGS. 2A and 2B, the nozzle 20 supplies both air and fuel, and it will be appreciated that the nozzle may also supply only air, only fuel, or only another type of fluid. The nozzle 20 and its components are generally made from a heat resistant metal or alloy because of its position within, or in proximity to, the combustor.

As will be discussed in greater detail below, air is conveyed to an interior of the body 30 before exiting the nozzle 20. Therefore, the body 30 is at least partially hollow, and defines therein an inner central passageway 34 which is coaxial about the nozzle center axis 22. The central passageway 34 is typically convergent (i.e. its cross-sectional area may decrease along its length, from inlet to outlet) in the downstream direction, thereby helping to converge the flow of air received therein. The central passageway 34 is a generally cylindrical opening which is circumscribed by an inner circumferential surface 33 of the body 30.

The convergence of the air received within the central passageway 34 may be further facilitated by an annular, circumferential cap 37. The cap 37 can be any tip or convergent extremity which causes the airflow passage to decrease in cross-sectional area along its length (i.e. towards its outlet) in order to converge the flow of air therein. It extends along a length parallel to the nozzle center axis 22 and coaxial thereabout away from the downstream surface 32. The distal and unattached extremity of the cap 37 defies an outer nozzle exit 38 of the body 30 through which the converged air is directed in order to mix with the fuel. As can be seen in FIG. 2B, the cap 37 can extend in an upstream direction past the downstream surface 32 and into the interior of the body 30. In such a configuration, the inner surface of the cap 37 circumscribes the central passageway 34 and defines the inner circumferential surface 33. The central passageway 34 in such a configuration of the cap 37 is therefore convergent toward the outer nozzle exit 38.

One or more air passages 40 also convey pressurized air through the body 30 of the nozzle 20. Each air passage 40 is any conduit, channel, opening, or other extension through the body 30 which conveys air from without the body 30 to within. The size, shape, and number of the air passages 40 can vary depending on the flow requirements of the nozzle 20, among other factors. The embodiments of the figures show nine air passages 40, although it will be appreciated that more or fewer air passages 40 may be used. Each air passage 40 may be formed by drilling or milling a hole into the body 30.

Each air passage 40 extends along a length from an air passage inlet 42, which receives the air to be conveyed, to an air passage outlet 44 which conveys the air into the central passageway 34. Each air passage 40 is oriented along a predominantly radial direction, meaning that the directional vector of each air passage 40 has a tangentially extending vector component, and a larger radially extending vector component. Such an orientation of the air passages 40 thereby directs air radially inward from the air passage inlet 42 through the body 30 toward the central passageway 34 and the nozzle center axis 22 via the air passage outlet 44. The expression "radially inward" refers to the orientation of each air passage 40, and thus to the direction of the air conveyed therein, in that each air passage 40 is oriented along a predominantly radial line from the nozzle center axis 22 and conveys air theretowards. It will be appreciated that the centerlines of the one or more air passages 40, and thus the air passages 40 themselves, can be angularly offset from a pure radial line emanating from the nozzle center axis 22. This angular offset can vary depending on the amount of spin it is desired to impart to the air conveyed through the air passages 40, amongst other factors.

Each air passage outlet 44 is positioned on the inner circumferential surface 33 of the body 30 so as to be in fluid communication with the central passageway 34. The air passage outlets 44 are each spaced apart from one another along the circumference of the inner surface 33. In most embodiments, the air passage outlets 44 are spaced equidistantly from one another along the circumference of the inner surface 33. If required, the air passage outlets 44 can also be spaced from one another at irregular intervals.

In some embodiments, an outer circumferential surface 35 of the body 30 can have a circumferential groove 36. The groove 36 forms a peripheral indent in the outer surface 35 of the body 30, and facilitates the conveyance of air into the air passages 40. Indeed, the air passage inlets 42 of the air passages 40 can be spaced circumferentially apart from one another along the circumferential groove 36. As with the air passage outlets 44, the air passage inlets 42 can be equidistantly or irregularly spaced apart from one another on the groove 36.

As mentioned, the fuel nozzle 20 also includes one or more fuel passages 50 which convey fuel through the body 30. As with the air passages 40, each fuel passage 50 can be any conduit, channel, opening, or other extension through the body 30 which conveys fuel from one end of the body 30 to another. The size, shape, and number of the fuel passages 50 can vary depending on the flow requirements of the nozzle 20, among other factors. The embodiments of the figures show three fuel passages 50, and it will be appreciated that more or fewer fuel passages 50 may be used. Indeed, for some nozzles 20, the number of fuel passages 50 can be a multiple of three. Each fuel passage 50 may also be formed by drilling or milling a hole into the body 30.

Figure 3:
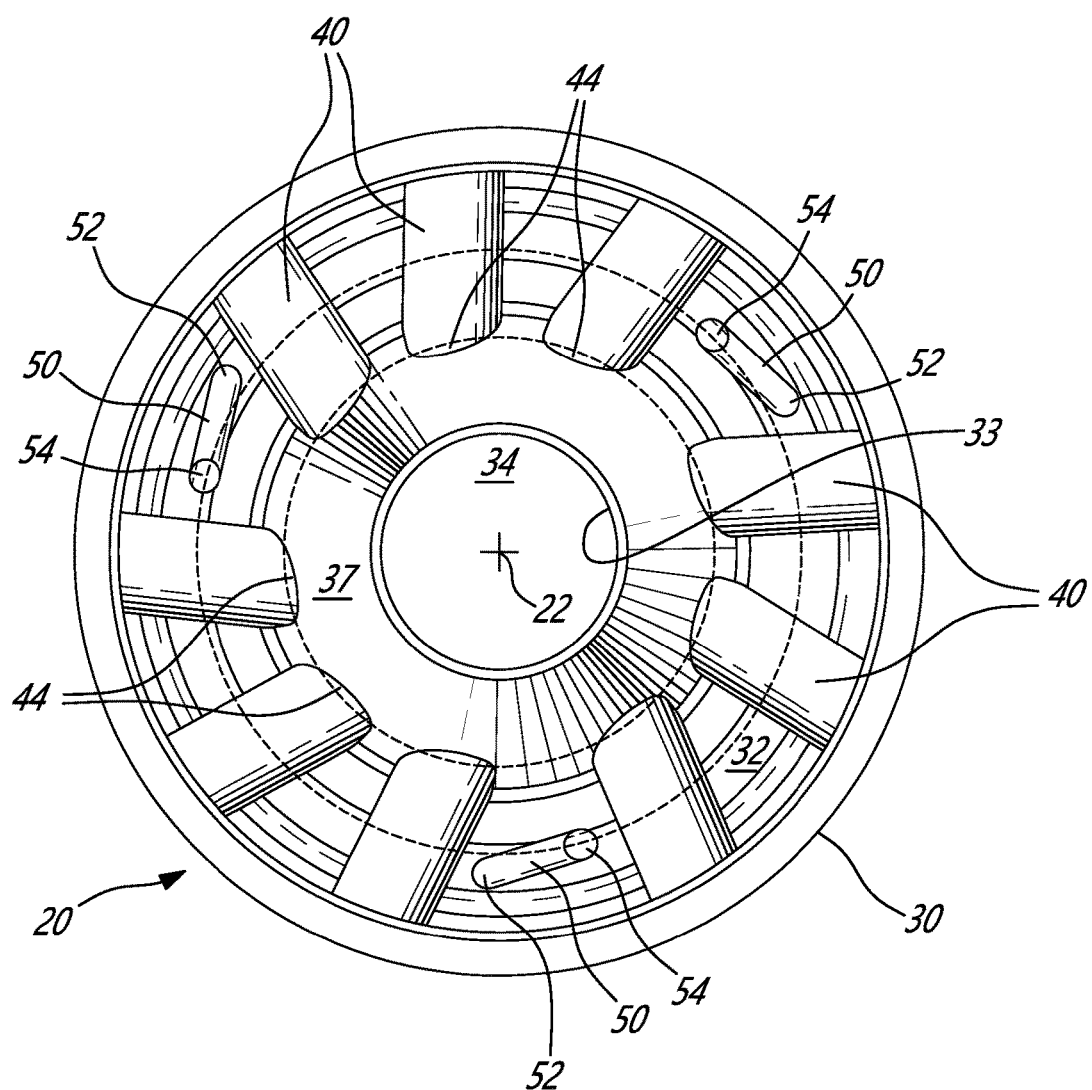
FIG. 3 is a front view of the atomizing nozzle of FIG. 2A, showing an interior of the nozzle.

As seen in FIG. 3, each fuel passage 50 conveys fuel from a fuel passage inlet 52 to a fuel passage outlet 54. The fuel passage inlet 52 is located at the upstream surface 31 of the body 30 and is generally coplanar therewith, while the fuel passage outlet 54 is located at the downstream surface 32 and is also generally coplanar therewith. It can thus be appreciated that each fuel passage 50 extends through the body 30, and is generally oriented along a direction which is parallel to the nozzle center axis 22. It can thus be understood that the fuel passages 50 extend along a predominantly axial direction with respect to the nozzle center axis 22. More particularly, each fuel passage 50 has a directional vector that is defined by a radially extending vector component and a larger axially extending vector component. As with the air passages 40, the fuel passages 50 can be angularly offset from the nozzle center axis 22 as shown in FIG. 3. More particularly, and as shown in FIG. 3, the fuel passages 30 are angularly offset from the nozzle center axis 22 in a circumferential direction. The fuel passage inlet 52 of a given fuel passage 50 is therefore circumferentially offset from the corresponding fuel passage outlet 54.

Referring still to FIG. 3, the contrast in the orientation of the air and fuel passages 40,50 is more easily seen. The predominantly axial fuel passages 50 are disposed between circumferentially adjacent air passages 40, which are predominantly radially oriented, within the body 30. More specifically, each fuel passage 50 is located within the body 30 between two adjacent and circumferentially spaced apart air passages 40, such that each fuel passage 50 is transverse to the direction of extension of the nearest air passages 40. Since the fuel passages 50 are substantially axially aligned with the nozzle center axis 22, and since the air passages 40 are substantially radial to the nozzle center axis 22, it can be understood that the fuel passages 50 "cross" or traverse the air passages 40 within the body 30. In some embodiments, the fuel passage outlets 54 may be disposed on the downstream surface 32 of the body 30 such that they are positioned downstream of the location of the air passage outlets 44 on the inner circumferential surface 33.

It can thus be appreciated that the air and fuel passages 40 and 50 traverse one another within the body 30, which is generally upstream of the output of the nozzle 20, represented in FIG. 3 by the cap 37. Therefore, the air and fuel passages 40,50 traverse one another at a portion of the nozzle 20 where there is a relatively greater volume compared to the output of the nozzle 20, which is a more constrained area. In being positioned at such a larger "upstream end", the air and fuel passages 40,50 are easier to design, manufacture, and maintain, especially when compared to some conventional nozzles which have crossing passages at the volumetrically-constrained tip of the nozzle. Furthermore, positioning the air and fuel passages 40,50 at the upstream end of the nozzle 20 provides greater tolerance between the air and fuel passages 40,50. The increased tolerance can also provide greater heat insulation between the relatively warm air in the air passages 40 and the relative cool fuel in the fuel passages 50.

Each of the fuel passages 50 within the body may therefore be circumferentially disposed between two groups of air passages 40, each of these groups include two or more (three are shown in FIG. 3) air passages. As shown in FIG. 3, the upstream ends of the air passages 40 within these groups may be grouped together (i.e. in closer circumferential proximity to each other) relative to an adjacent group of air passages 40 so as to define a circumferential space in the body 30 of the fuel nozzle 20 for the substantially transversely extending fuel passage 50 within said circumferential space. As shown in FIG. 3, the air passage inlets 42 of the same group of air passages 40 may be spaced a first circumferential distance from each other. The air passage inlets 42 of two adjacent air passages 40 from different groups of air passages 40 may be spaced a second circumferential distance. As further visible in FIG. 3, the first circumferential distance may be smaller than the second circumferential distance to allow more space between the adjacent groups of the air passages 40 for the fuel passages 50. Similarly, the air passage outlets 44 of the same group of air passages 40 may be spaced a third circumferential distance from each other. The air passage outlets 44 of two adjacent air passages 40 from different groups of air passages 40 may be spaced a fourth circumferential distance. As shown in FIG. 3, the third circumferential distance may be smaller than the fourth circumferential distance to allow more space between the adjacent groups of the air passages 40 for the fuel passages 50. These groups of air passages provide air to the central air passageway 34, the exit of which may be constrained (i.e. having a converging nozzle or another flow restrictor which reduces the cross-sectional area of the exit opening of the central air passageway 34) such as to create a high velocity in the air exiting the central air passageway 34. This accordingly provides a fuel nozzle 20 in which the air passages 40 and the central air passageway 34 cooperate together and are designed to act in conjunction with the exits of the fuel passages 50 to create a desired fuel atomisation and spatial distribution.

Figure 4:
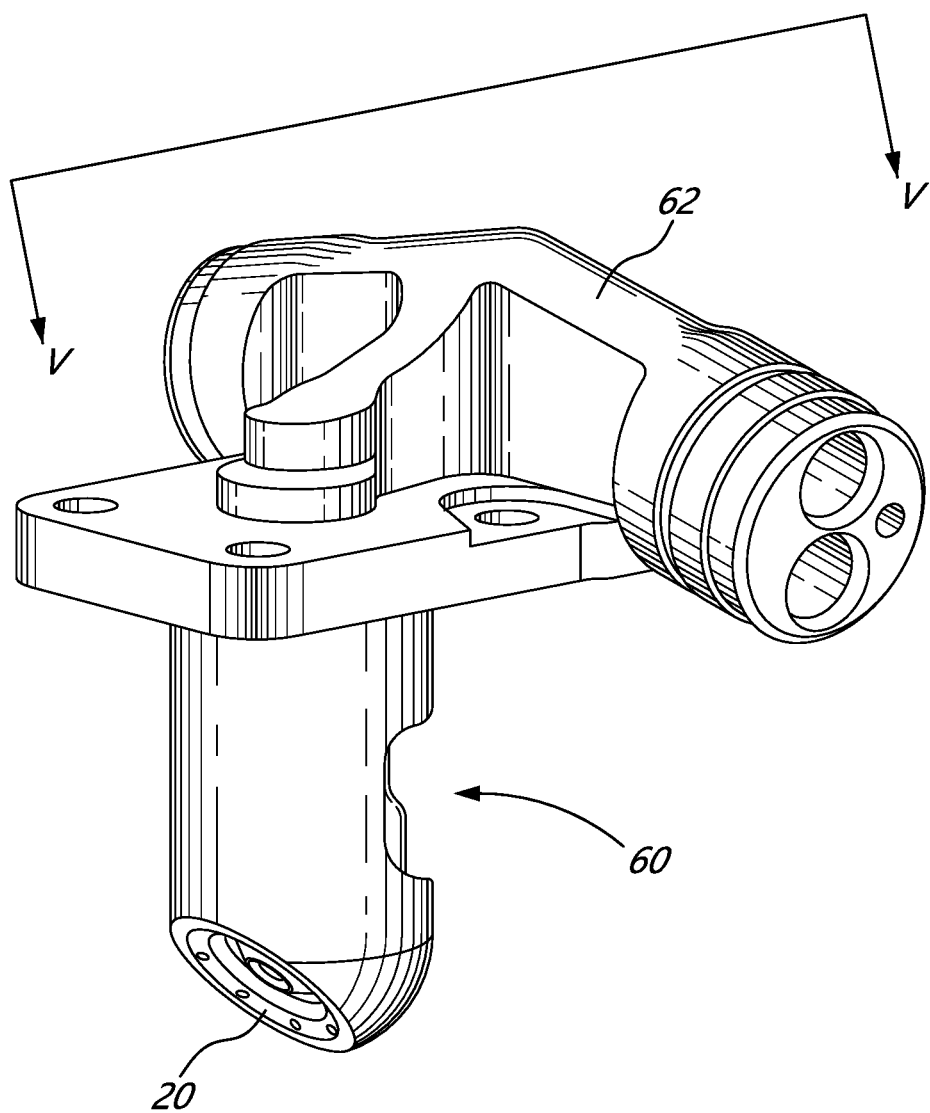
FIG. 4 is a perspective view of a dual passage fuel nozzle and mounting support, according to another embodiment of the present disclosure.

Referring now to FIG. 4, the nozzle 20 as described above may be an outer airblast nozzle and forms part of a dual passage fuel nozzle 60, as shown in FIG. 4. The dual passage fuel nozzle 60 is generally a hybrid nozzle which is positioned within, or in proximity to, the combustor. It supplies a fine spray of air and fuel to the combustor so as to be combusted in order to generate the hot combustion gases. The dual passage fuel nozzle 60 can have a mounting bracket 62 or other structural support which allows it to be securely mounted in place, and which provides input feed lines to supply air and fuel to the dual passage fuel nozzle 60.

Figure 5A:
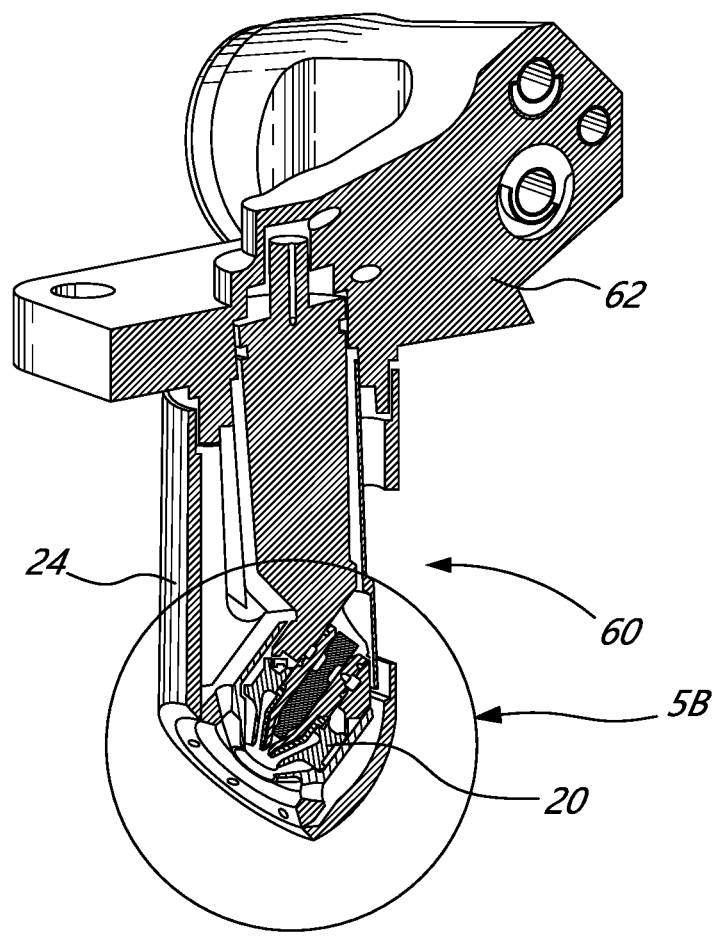
FIG. 5A is a cross-sectional view of the dual passage fuel nozzle of FIG. 4, taken along the line V-V of FIG. 4.
Figure 5B:
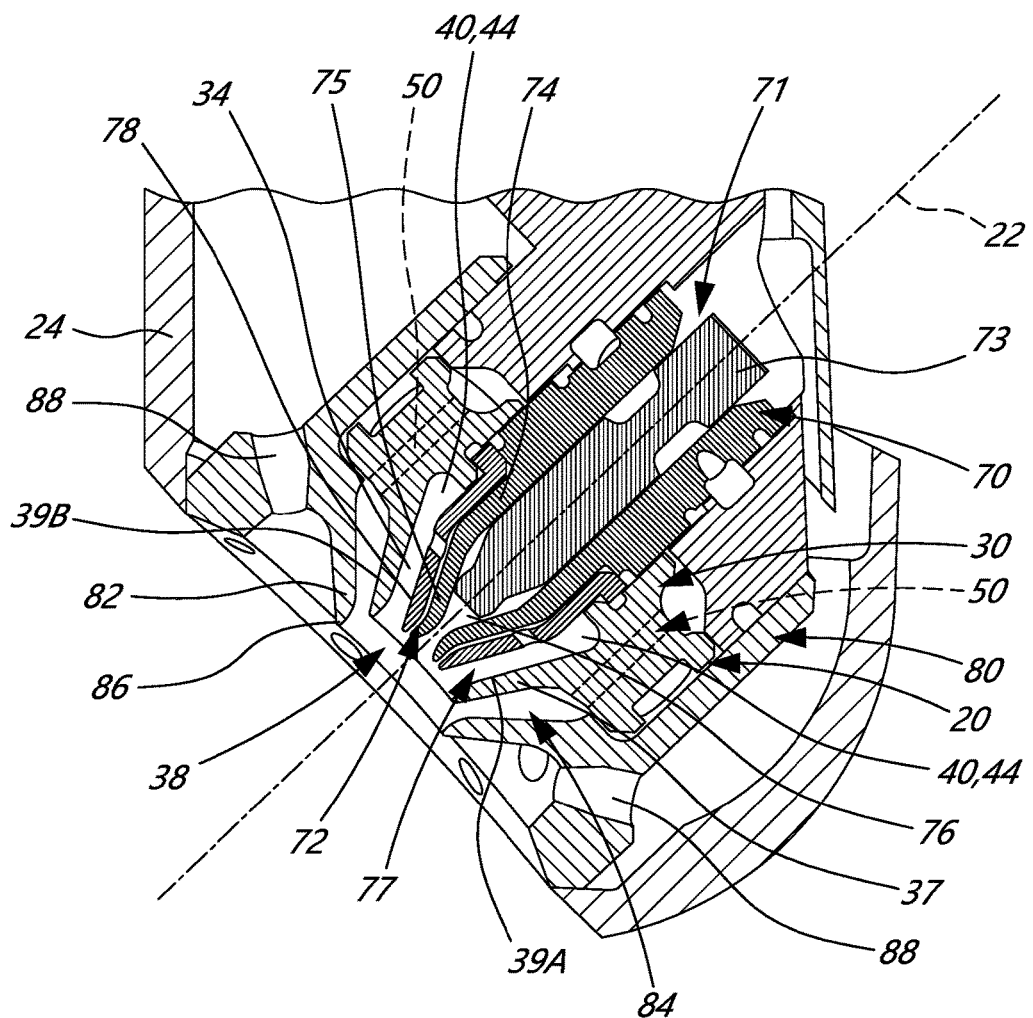
FIG. 5B is an enlarged, fragmentary cross-sectional view of the circled portion 5B in of FIG. 5A.

The components of the dual passage fuel nozzle 60 are better shown in FIGS. 5A and 5B. The dual passage fuel nozzle 60, as its name suggests, generally has two nozzles within the same structure. One such nozzle is an inner fuel atomizing nozzle 70, and the other nozzle is the outer, airblast atomizing nozzle 20 described above. Both nozzles 20,70 are contained in an outer nozzle sheath 24 which forms the outer shell of the dual passage fuel nozzle 60 and encloses both the inner atomizing nozzle 70 and the outer atomising nozzle 20. The nozzle sheath 24 directs air into the dual passage fuel nozzle 60, diverts water and other foreign materials away from the air passages 40, and provides support to help hold the combustor in place. Both the inner atomizing nozzle 70 and the outer atomizing nozzle 20 will now be described in greater detail.

In hybrid or dual passage fuel nozzles 60, the inner atomizing nozzle 70 generally receives and outputs only fuel. Although used throughout all operating modes of engine operation, it is particularly useful during engine start-up or ignition, and employs a drop in fuel pressure to atomize the fuel by reducing the size of the fuel droplets. The inner atomizing nozzle 70 is therefore able to generate a very fine mist of fuel for a relatively small flow capacity, which is ideal for engine start-up. During normal engine operation, the inner atomizing nozzle 70 is used with the outer atomizing nozzle 20 to meet the operating needs of the engine. The inner atomizing nozzle 70 can thus be referred to as a "starting" nozzle.

In some embodiments, the inner atomizing fuel nozzle 70 has a fuel distributor 73, which is generally an elongated annular body which is coaxial about the nozzle center axis 22. It extends along a length between an upstream end 71 of the fuel atomizing nozzle 70 and a downstream end 72. The fuel distributor 73 receives a supply of fuel from an upstream supply in the dual passage fuel nozzle 60, increases the pressure of the fuel, and outputs via an outlet 76 as a fine spray. The inner atomizing nozzle 70 generally has a convergent outer member 74 which encloses the fuel distributor 73, when present, and which is a hollow annular member being coaxial about the nozzle center axis 22. The outer member 74 has a convergent extremity 75 or cone at the downstream end 72 which channels the fuel from the fuel distributor 73 to a relatively small exit from the inner atomizing nozzle 70. In some embodiments, the inner atomizing nozzle 70 has a heat shield 78 which encloses the convergent extremity 75 and is coaxial therewith about the nozzle center axis 22. The heat shield 78 shields and at least partially insulates the convergent outer member 74 and the fuel distributor 73 from the much hotter air supplied by the outer atomizing nozzle 20.

The outer atomizing fuel nozzle 20 is as described above. It provides the main airblast to the dual passage fuel nozzle 60, and also provides addition fuel to complement that provided by the inner atomizing nozzle 70 for optimal normal engine operation. The body 30 of the outer atomizing nozzle 20 is disposed about the convergent outer member 74 of the inner atomizing nozzle 70 so as to surround and enclose it. The body 30 is also coaxial with the convergent outer member 74. The annular cap 37 has an inner cap surface 39A which is exposed to the interior of the cap 37 and thus to the central passageway 34. The inner cap surface 39A is spaced radially apart from an outer surface of the convergent outer member 74 so as to define an annular cavity 77 therearound. The cavity 77 is essentially part of the central passageway 34 and receives therein the air conveyed by the air passages 40 via the air passage outlets 44. Where the inner atomizing nozzle 70 employs a heat shield 78, the heat shield 78 essentially occupies a portion of the cavity 77 such that it is defined between a radially outer surface of the heat shield 78 and the inner cap surface 39A.

In some embodiments, the dual passage fuel nozzle 60 may have a circumferential fuel flow converger 80. The flow converger 80 directs and converges the fuel conveyed by the fuel passages 50 towards the outer nozzle exit 38. The flow converger 80 is a generally annular body having a hollow central portion which encloses the outer atomizing nozzle 20 and is coaxial therewith about the nozzle center axis 22. The flow converger 80 can have secondary air passages 88 positioned circumferentially within the flow converge for supply additional air is desired. At its downstream extremity, the flow converger 80 has a flow converger apex 82 in proximity to the outer nozzle exit 38 and enclosing the cap 37 of the outer atomizing nozzle 20. A second annular cavity 84 is defined between an inner surface of the flow converger apex 82 and an outer cap surface 39B of the cap 37. Each of the fuel passage outlets 54 may be in fluid communication with the second cavity 84 in order to convey fuel thereto. The flow converger apex 82 has a fuel filming surface 86 at an extremity. The fuel filming surface 86 defines a location where the fuel exiting the fuel passages 50 mixes with the air exiting the outer nozzle exit 38 and with the fuel exiting the outlet 76 of the fuel distributor 73. The constraint of the cavity 77 near the air passage outlets 44 helps to ensure a high air velocity at the fuel filming surface 86.

In light of the preceding, it can be appreciated that the dual passage air nozzle 60 disclosed herein groups and positions air passages 40, which pass across the fuel passages 50, at the upstream end of the dual passage air nozzle 60 in order to allow more space for the required fuel passages 50. This non-uniform arrangement of air and fuel passages 40,50 would ordinarily be avoided because it may result in the non-uniformity of the resultant fuel spray produced by the dual passage air nozzle 60. The dual passage air nozzle 60 disclosed herein addresses this issue by conveying the output of the grouped air passages 40 into the cavity 77. The exit of this cavity 77 is constrained to ensure a high air velocity at the fuel filming surface 86, and to prevent carbon accumulation on the exterior faces of the inner atomizing nozzle 70. As a consequence, any non-uniformity of the air flows is reduced or eliminated, and the resultant fuel spray is unaffected. The grouping of the air passages 40 allows for an increase in the wall thickness between the air and fuel passages 40,50, which is desirable because the area where the air and fuel passages 40,50 are grouped is generally a highly stressed area due to the thermal gradient.

There is also provided a method of spraying an air and fuel mixture with a nozzle 20 having a nozzle center axis 22 and an inner central passageway 34. The method includes conveying the air through air passages 40 along a first direction through the nozzle 20 toward the nozzle center axis 22 and the central passageway 34. This is generally achieved by orienting the air passages 40 along a substantially radial direction to the nozzle center axis 22. The method also includes conveying the fuel via fuel passages 50 through the nozzle 20 and between adjacent air passages 40, which are circumferentially spaced apart. The fuel is conveyed along a second direction, which is transverse to the first direction. Optionally, the second direction can be predominantly parallel to the nozzle center axis 22. The fuel passages 50 therefore traverse the air passages 40 within the body of the nozzle 20.

The method also includes conveying the fuel from the fuel passages 50 via fuel passage outlets 54, and conveying the air from the air passages 40 via air passage outlets 44. The fuel exits the fuel passage outlets 54 downstream of the air exiting the air passage outlets 44, thereby helping to ensure that the air and fuel passages 40,50 are upstream of the area where mixture of the air and fuel occurs. The fuel and air mix together to produce the spray of air and fuel mixture. In some embodiments, the conveying of the air and fuel through the air and fuel passages 40,50, respectively, includes imparting a swirl to the spray of air and fuel. This swirl can help to better mix the air and fuel and help to ensure efficient combustion. This can also include restricting the flow of air and fuel in order to converge together the air exiting the air passage outlets 44 and the fuel exiting the fuel passage outlets 54.

The above description is meant to be exemplary only, and one skilled in the art will recognize that changes may be made to the embodiments described without departing from the scope of the invention disclosed. For example, although the nozzles 20/60 disclosed herein are described as employing fuel and air, it will be appreciated that the nozzles 20/60 can use other fluids if so desired. Still other modifications which fall within the scope of the present invention will be apparent to those skilled in the art, in light of a review of this disclosure, and such modifications are intended to fall within the appended claims.

The invention claimed is:

1. A fuel nozzle for a combustor of a gas turbine engine, comprising:
   an annular body defining a nozzle center axis, the body axially extending along the nozzle center axis between an upstream surface and a downstream surface, and having an inner circumferential surface circumscribing a central air passageway being coaxial with the nozzle center axis;
   a plurality of air passages, each of the air passages extending predominantly radially inward through the body toward the nozzle center axis between an air passage inlet and an air passage outlet, the air passage outlets of each of the air passages circumferentially spaced apart from one another along the inner circumferential surface of the body, each of the air passages in use conveying air through the body toward the nozzle center axis and into the central air passageway, the plurality of air passages arranged in circumferential groups of the air passages, each of the groups having at least two of the air passages, the air passage inlets of the air passages in each of the groups of the air passages being spaced a first circumferential distance from each other, the air passage inlets of two adjacent air passages of the air passages from two adjacent groups of the groups of the air passages being spaced a second circumferential distance, the first circumferential distance being less than the second circumferential distance, each of the groups being circumferentially spaced apart from adjacent another one from the groups on the body to define the second circumferential distance therebetween; and a plurality of fuel passages, each of the fuel passages axially extending through the body between a fuel passage inlet at the upstream surface of the body and a fuel passage outlet at the downstream surface of the body, each of the axially extending fuel passages disposed circumferentially between the two adjacent air passages from the adjacent groups that are spaced the second circumferential distance apart, the fuel passages being transverse to the plurality of air passages, the fuel passage inlet of each of the fuel passages being circumferentially and axially offset from the fuel passage outlet.

2. The fuel nozzle as defined in claim 1, wherein the fuel passage outlets of the plurality of fuel passages are disposed axially downstream of the air passage outlets of the plurality of air passages.

3. The fuel nozzle as defined in claim 1, further comprising a circumferential cap extending away from the downstream surface of the body along a direction parallel to the nozzle center axis and converging theretowards at an outer nozzle exit.

4. The fuel nozzle as defined in claim 3, further comprising a circumferential fuel flow converger enclosing the body and being coaxial therewith, the flow converger having a flow converger apex disposed about the circumferential cap, a second cavity defined between the flow converger apex and an outer cap surface of the circumferential cap.

5. The fuel nozzle as defined in claim 4, wherein the fuel passage outlets of the plurality of fuel passages are in fluid communication with the second cavity to convey fuel thereto.

6. The fuel nozzle as defined in claim 4, wherein the flow converger apex defines a fuel filming surface at an extremity thereof.

7. The fuel nozzle as defined in claim 1, wherein the groups of the air passages provide air to the central air passageway, the exit of the central air passageway is constrained to increase a velocity of the air exiting the central air passageway.

8. The fuel nozzle as defined in claim 1, wherein an outer circumferential surface of the body has a circumferential groove defining a circumferentially-extending inner radial wall, the air passage inlets of the air passages being circumferentially spaced apart from one another and disposed on the inner radial wall.

9. A fuel nozzle for a combustor of a gas turbine engine, comprising:

an inner fuel atomizing nozzle in use conveying fuel along a nozzle center axis from an upstream end to a downstream end, the inner fuel atomizing nozzle having a convergent outer member converging towards a convergent extremity defining an outlet coaxial with the nozzle center axis;

an outer atomizing nozzle, comprising:

an annular body disposed about the convergent outer member and coaxial therewith, the body axially extending between an upstream surface and a downstream surface and having an inner circumferential surface;

a circumferential cap extending away from the downstream surface of the body and converging towards an outer nozzle exit coaxial with the nozzle center axis, the circumferential cap having an inner cap surface and defining a cavity between the inner cap surface and the convergent outer member of the inner fuel atomizing nozzle;

a plurality of air passages, each of the air passages extending predominantly radially inward through the body toward the nozzle center axis between an air passage inlet and an air passage outlet, the air passage outlets of each of the air passages circumferentially spaced apart from one another about the inner circumferential surface of the body, each of the air passages in use conveying air through the body and into the cavity, the plurality of air passages arranged in circumferential groups of the air passages, each of the groups having at least two of the air passages, the air passage inlets of the air passages in each of the groups of the air passages being spaced a first circumferential distance from each other, the air passage inlets of two adjacent air passages of the air passages from two adjacent groups of the groups of the air passages being spaced a second circumferential distance, the first circumferential distance being less than the second circumferential distance, each of the groups being circumferentially spaced apart from a circumferentially adjacent another one from the groups on the body to define the second circumferential distance therebetween; and a plurality of fuel passages, each of the fuel passages axially extending through the body between a fuel passage inlet at the upstream surface of the body and a fuel passage outlet at the downstream surface of the body, each of the axially extending fuel passages disposed circumferentially between the two adjacent air passages from the adjacent groups that are spaced the second circumferential distance apart, the fuel passages being transverse to the plurality of air passages, the fuel passage inlet of each of the fuel passages being circumferentially and axially offset from the fuel passage outlet.

10. The fuel nozzle as defined in claim 9, wherein the fuel passage outlets of the plurality of fuel passages are disposed axially downstream of the air passage outlets of the plurality of air passages.

11. The fuel nozzle as defined in claim 9, wherein the inner fuel atomizing nozzle has a heat shield enclosing the convergent extremity and being coaxial therewith, the cavity defined between the inner cap surface and an outer surface of the heat shield.

12. The fuel nozzle as defined in claim 9, further comprising a circumferential fuel flow converger enclosing the outer atomizing nozzle and being coaxial therewith, the flow converger having a flow converger apex disposed about the circumferential cap of the outer atomizing nozzle, a second cavity defined between the flow converger apex and an outer cap surface of the circumferential cap.

13. The fuel nozzle as defined in claim 12, wherein each of the fuel passage outlets is in fluid communication with the second cavity to convey fuel thereto.

14. The fuel nozzle as defined in claim 12, wherein the flow converger apex defines a fuel filming surface at an extremity thereof.

15. The fuel nozzle as defined in claim 14, wherein an outer circumferential surface of the body has a circumferential groove defining a circumferentially-extending inner radial wall, the air passage inlets of the air passages being circumferentially spaced apart from one another and disposed on the inner radial wall.

16. The fuel nozzle as defined in claim 14, further comprising a nozzle sheath enclosing the inner fuel atomizing nozzle and the outer atomizing nozzle.

* * * * *